UNITED STATES PATENT OFFICE.

LOOMIS G. MARSHALL, OF NEW YORK, N. Y., ASSIGNOR TO HIMSELF AND ANDREW COCHRAN, OF SAME PLACE.

IMPROVEMENT IN DESULPHURIZING METALS AND ORES.

Specification forming part of Letters Patent No. 42,441, dated April 19, 1864.

*To all whom it may concern:*

Be it known that I, LOOMIS G. MARSHALL, formerly of the city of Philadelphia, but now of New York city, and State of New York, have invented a new and useful Mixture of Fluxes for Desulphurizing Ores and all the Various Metals; and I do hereby declare that the following is a full and exact description of the combination to be used as a flux.

The nature of my discovery and invention consists in the mixing of petroleum-oil with heated water, borax, sal-ammoniac, or prussiate of potash, (in the proper quantities, as the case requires,) to be applied as a flux to my tubular furnace for desulphurizing ores, patented September 1, 1863, or to be used and applied to any other furnace for the same purpose. The object is to form a caloric vapor to produce a great heat. The petroleum-oil aids the steam in freeing the sulphur, and the gases produced by the combination of these ingredients composing the flux take up the sulphur and use it as a fuel, giving greater relief in working the ores after they are freed.

In desulphurizing iron ores, or other ores that may be overdone by intense heat, I add the borax, sal-ammoniac, and prussiate of potash in a fluid state to intermingle and combine with the petroleum-oil and heated water to hold the heat in check, and prevent it from burning the metals or overdoing them by the intense heat that is produced.

I apply these fluxes to the ores in my furnace by making a small opening at or near the bottom to admit a small pipe, through which the fluxes can be passed.

I do not wish to confine myself to any particular mode or manner of introducing these fluxes; but I desire to secure the use of petroleum-oil with heated water or steam, in combination with the borax, sal-ammoniac, or prussiate of potash, as the case may require, to be applied and used in my aforesaid tubular furnace, or any other furnace for desulphurizing ores. Therefore,

What I claim as my invention, and desire to secure by Letters Patent, is—

The use of petroleum-oil intermingled and combined with heated water, borax, sal-ammoniac, or prussiate of potash, to be applied in a fluid state through a pipe or pipes to my tubular furnace, or any other furnace for desulphurizing ores.

LOOMIS G. MARSHALL.

Witnesses:
WHEELER F. CLARKE,
A. B. COCHRAN.